Sept. 9, 1947.          C. KAMPF          2,427,004
CONTAINER HANDLE
Filed Nov. 13, 1945          2 Sheets-Sheet 1
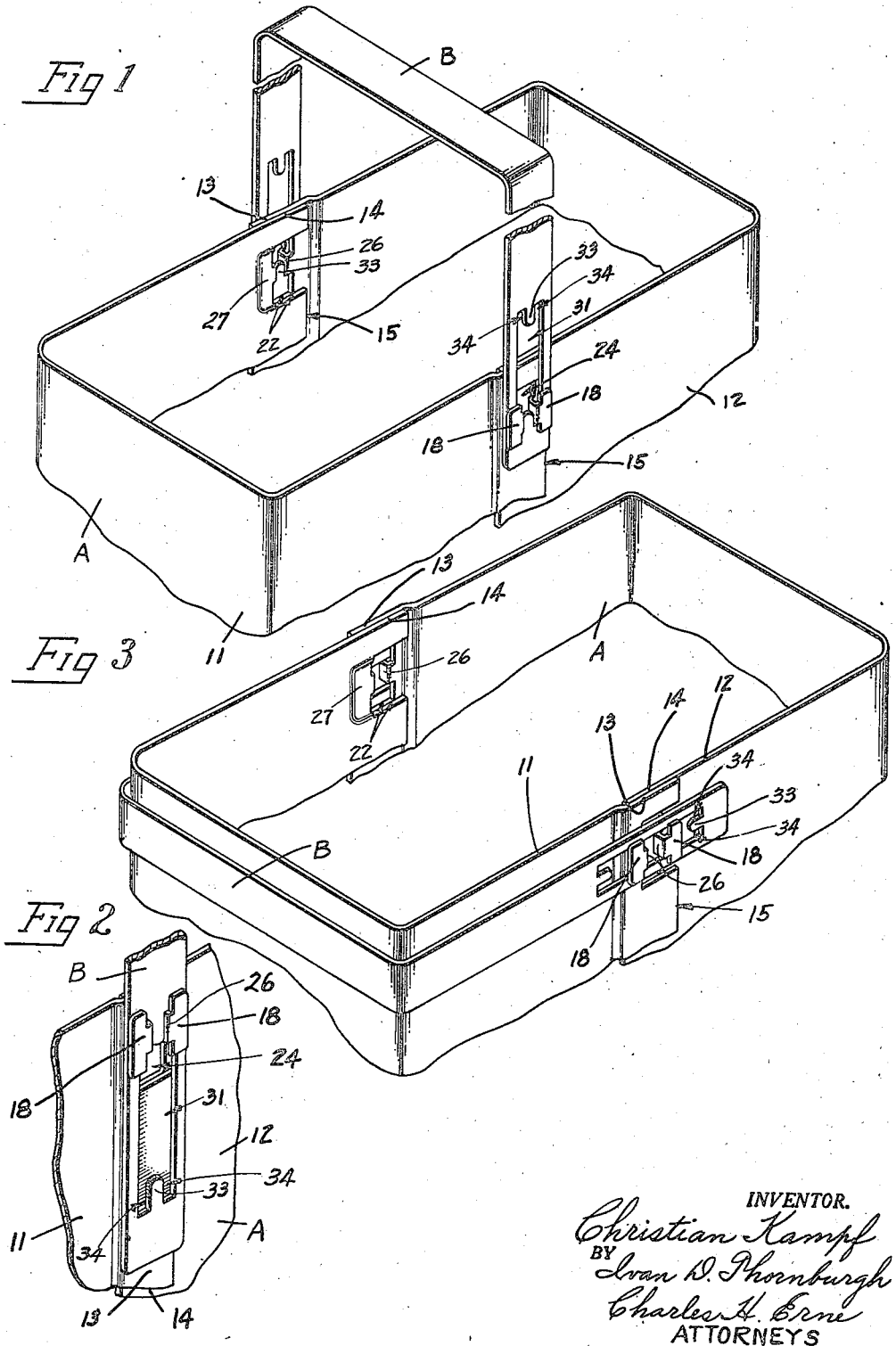
INVENTOR.
Christian Kampf
BY Ivan D. Thornburgh
Charles H. Erne
ATTORNEYS Sept. 9, 1947.                C. KAMPF                2,427,004
                          CONTAINER HANDLE
                        Filed Nov. 13, 1945            2 Sheets-Sheet 2
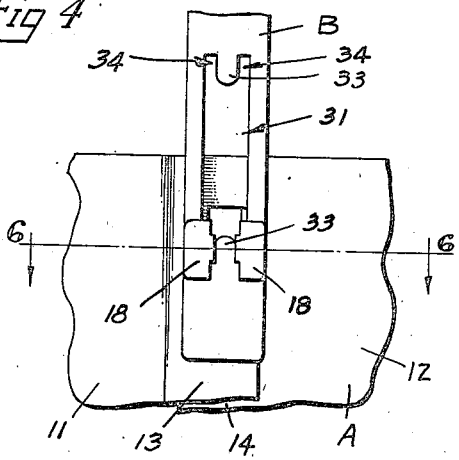
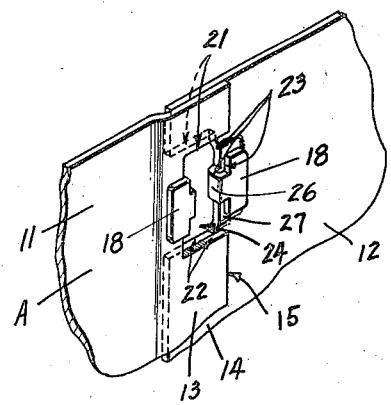
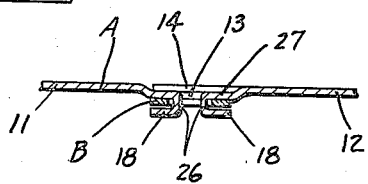
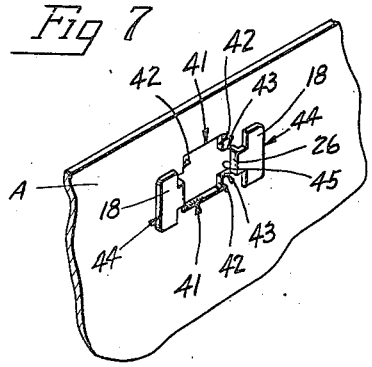
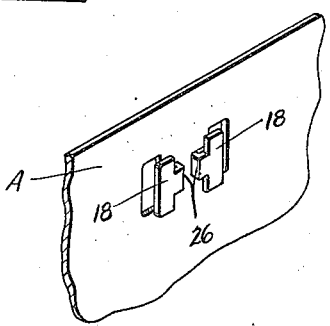
INVENTOR.
Christian Kampf
BY
Ivan D. Thornburgh
Charles H. Erne
ATTORNEYS Patented Sept. 9, 1947

2,427,004

UNITED STATES PATENT OFFICE 2,427,004

CONTAINER HANDLE

Christian Kampf, Melrose Park, Ill., assignor to American Can Company, New York, N. Y., a corporation of New Jersey Application November 13, 1945, Serial No. 628,237

8 Claims. (Cl. 220—96)

The present invention relates to container handles or bails and has particular reference to devices for locking the handle of a container in a predetermined position.

An object of the invention is the provision of a locking device for the handle of a container wherein the handle may be locked against swinging when in a carrying position and may be unlocked for turning into an out-of-the-way noncarrying position as desired.

Another object is the provision of such a locking device which is applicable to any type of container and which is simple in construction and economical of manufacture.

Numerous other objects and advantages of the invention will be apparent as it is better understood from the following description, which, taken in connection with the accompanying drawings, discloses a preferred embodiment thereof.

Referring to the drawings:

Figure 1 is a perspective view of the upper portion of a container embodying the instant invention, the view showing the handle of the container in a locked carrying position;

Fig. 2 is a perspective view showing a portion of the container illustrated in Fig. 1 with the handle in a different locked position;

Fig. 3 is a perspective view similar to Fig. 1 and showing the handle in an out-of-the-way position adjacent the sides of the container;

Fig. 4 is an enlarged fragmentary detail of the locking device and the immediately adjacent portions of the container and the handle;

Fig. 5 is a perspective view of the locking device shown in Fig. 4, with parts of the container broken away;

Fig. 6 is a sectional view taken substantially along the line 6—6 of Fig. 4; and Figs. 7 and 8 are enlarged perspective details of two modified forms of the locking device shown in Fig. 1.

As a preferred embodiment of the instant invention the drawings illustrate the upper portion of a sheet metal container A which may be a part of any type of container which is carried by an attached handle B. In this preferred form of the invention the portion of the container to which the handle B is attached is made in two U-shaped pieces 11, 12 (Fig. 3) having wide seam edges 13, 14 which are joined in any suitable manner. The drawings show one of these side seam edges offset and overlapping the other and the two edges welded together in a lap side seam 15.

The handle or bail B is adapted to surround substantially one half of the periphery of the container A when in an out-of-the-way position as shown in Fig. 3. When swung up into a raised and vertical position as in Fig. 1 it is in position for carrying the container. In Fig. 2 while the handle is still vertical it is pushed down and rests on the container. To adapt the handle to these various positions, the ends of the handle are freely attached to the container adjacent the side seams 15 by a pair of lugs 18 which constitute parts of a locking device for holding the handle in its carrying and in its resting positions.

The lugs 18 preferably are struck out portions of the container A, the side seam edges 13, 14 of the container being cut back along straight lines of severance 21, 22 (Fig. 5) and along irregular lines of severance 23 to form a pair of T-shaped members connected with the container and disposed in openings 24 adjacent the side seam edges. These T-shaped members are bent outwardly away from the container and are then folded back adjacent and parallel with the outer surface of the side seam, as shown in Fig. 5. There is thus produced, the two lugs 18 connected along their inner edges to the side seam by way of narrow stems or necks 26.

The lugs 18 are spaced away from the outer surface of the container a distance slightly greater than the thickness of the handle B. The side seam edge 14 of the container is formed with a boss 27 which is disposed below and adjacent the lug 18 on that edge and this boss extends outwardly into the opening 24 of the side seam edge 13 and is flush with the outer surface of the side seam at this opening.

The handle B preferably is made of flat sheet metal and is of a thickness slightly less than the space between the lugs 18 and the outer surface of the side seam. The lugs 18 on each side of the container extend through an elongated slot 31 (Fig. 4) formed in the end of the handle on that side. The two lugs on each side project outwardly in opposite directions overhanging the handle. This construction retains the ends of the handle in place on the container. The width of the slot 31 on each side is slightly greater than the width of the necks 26 of the lugs 18 on that side and this permits easy swinging of the handle into or out of its out-of-the-way position, as illustrated in Fig. 3.

At each end of each slot 31, the surrounding part of the handle is formed with a tongue 33 (Fig. 4) which is in the plane of the handle end and which extends into the ends of the slot. In other words the tongue is narrower than the slot and its sides are in spaced relation to the sides of the handle, thus setting off clearance openings or slits 34.

Hence when the handle B is in a vertical position and is lifted up so that the lugs 18 are at the lower end of the slots 31 of the handle, as when carrying the container (best shown in Figs. 1 and 4), the lower tongue 33 on each side of the handle is between the lug necks 26 on that side. This locates the necks in the clearance slits 34. The two tongues thus are locked between the corresponding lugs and this holds the handle in fixed position against swinging.

When the container is set down upon the ground or other support, this may be referred to as a rested position, the handle B may be lowered but still retained in a vertical position. This is done by pushing the handle down until the lugs 18 are adjacent the upper ends of the slots 31, as best shown in Fig. 2. In this position of the handle, the upper tongues 33 are located between the necks 26 of the lugs and the necks are locked in the clearance openings or slits 34 adjacent the upper tongue on each side. The handle is thereby locked against lateral movement in the same manner as when in a carrying position.

To swing the handle into a horizontal out-of-the-way position, as shown in Fig. 3, it is merely necessary first to unlock the handle by raising it from the position shown in Fig. 2 if it is in rested position, or by lowering it from the position shown in Fig. 1 if it is in carrying position. In this unlocked position, the lugs 18 are intermediate of the ends of the slots 31 and are clear of the locking tongues 33. Thereafter the handle is readily pivoted on the lug necks 26 and is brought into the desired horizontal position of Fig. 3.

Where the container is made of one piece of material, as in a die drawn container, or where it is desired to fasten the handle ends at a place other than the side seam of the container, the lugs 18 may be struck out of any wall part of the container. This is disclosed in the modified forms of the invention shown in Figs. 7 and 8.

In Fig. 7 the lugs 18 are formed by cutting through the material of the container A along connecting angularly disposed lines of severance 41, 42, 43 forming two sides of a cross. This cross is further cut through the middle, vertically, along a line of severance 44. There is thus formed two T-shaped blanks which are connected with the body along their narrow uncut edges 45. The T-shaped blanks are bent outwardly at first to form the necks 26 and then the heads of the T are bent further in opposite directions to bring them into a position parallel with and spaced away from the container. This produces the locking and supporting lugs 18.

In this modified form of the invention the lugs 18 are similar to the lugs 18 in the preferred form with the exception that the lugs of the modified form are spaced slightly further apart. However, the same construction of handle is used the width of the slots 31 being properly dimensioned to obtain the same locking feature.

In the second modified form of the invention, as disclosed in Fig. 8, the locking lugs 18 are formed by cutting through the material of the container at two places in a T shape, leaving uncut the metal at their bases. The two T shaped blanks then are bent outwardly along their uncut base edges to form the necks 26 and this is followed by a bending of the heads of the blanks in opposite directions and into positions parallel with and spaced away from the container wall. This produces the locking and supporting lugs 18.

In this second modified form the necks 26 of the lugs may be positioned close together so that a narrower handle B may be used. The slotted and tongued handle is used with this second modified form of the invention and hence the same locking feature is retained.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The combination of a container, a pair of adjacent outwardly projecting and oppositely flared lugs having enlarged heads and smaller neck sections on said container, a bail having an elongated opening adjacent an end thereof, in which the neck sections of said lugs freely operate for retaining the bail on the container and on which said bail may be pivoted, and a tongue on said bail and projecting into said opening for engagement with said lugs for holding the bail against lateral movement relative to the container when in a container carrying position.

2. The combination of a container, a pair of adjacent outwardly projecting and oppositely flared lugs having enlarged heads and smaller neck sections on said container, a bail having an elongated slot adjacent an end thereof in which the neck sections of said lugs freely operate for retaining the bail on the container and on which said bail may be pivoted, and a pair of tongues on said bail and disposed one at each end of said slot for engagement with said lugs for holding the bail against lateral movement relative to the container when the bail is in a vertical position with the lugs at either end of the slot in the bail.

3. The combination of a container, a pair of adjacent outwardly projecting and oppositely flared lugs having enlarged heads and smaller neck sections on said container, a bail having an elongated slot adjacent an end thereof in which the neck sections of said lugs freely slide for retaining the bail on the container and on which said bail may be pivoted, and a tongue on said bail and extending into said slot for insertion between the necks of said lugs when the bail is in carrying position, said tongue being narrower than said slot and setting off a pair of slits thereadjacent for the reception of the necks of said lugs when the tongue is disposed therebetween for locking said bail in its carrying position against lateral displacement therefrom.

4. The combination of a container, a pair of adjacent outwardly projecting and oppositely flared lugs having enlarged heads and smaller neck sections struck out from the material of said container, a bail having an elongated opening adjacent an end thereof in which the neck sections of said lugs freely operate for retaining the bail on the container and on which said bail may be pivoted, and a tongue on said bail and projecting into said opening for engagement with said lugs for holding the bail against lateral movement relative to the container when in a container carrying position.

5. The combination of a container having a side seam, a pair of adjacent outwardly projecting and oppositely flared lugs having enlarged heads and smaller neck sections struck out from the side seam edges of said container, a bail having an opening adjacent an end thereof in which the neck sections of said lugs freely operate for retaining the bail on the container and on which said bail may be pivoted, and means on said bail for engagement with the neck sections of said lugs for holding the bail against lateral movement relative to the container when in a carrying position.

6. The combination of a container having a side seam, a pair of adjacent outwardly projecting and oppositely flared lugs having enlarged heads and smaller neck sections struck out from said container, a bail having an opening adjacent an end thereof in which the neck sections of said lugs freely operate for retaining the bail on the container and on which said bail may be pivoted, and means on said bail for engagement with the neck sections of said lugs for holding the bail against lateral movement relative to the container when in a carrying position.

7. The combination of a container having a side seam, a pair of adjacent T-shaped lugs having outwardly projecting neck sections and oppositely disposed head sections in spaced and parallel relation to said container and struck out from said container, a bail having an opening adjacent an end thereof in which the neck sections of said lugs freely operate for retaining the bail on the container and on which said bail may be pivoted, and means on said bail for engagement with the neck sections of said lugs for holding the bail against lateral movement relative to the container when in a carrying position.

8. The combination of a container, a pair of adjacent outwardly projecting and oppositely flared lugs having enlarged heads and smaller neck sections on opposing sides of said container, a bail having an elongated opening adjacent each end thereof in which the neck sections of said lugs on the opposing sides of said container freely operate for retaining the bail on the container and on which said bail may be pivoted, and a tongue on said bail at each end thereof and projecting into said openings for engagement with said lugs for holding the bail against lateral movement relative to the container when in a container carrying position.

CHRISTIAN KAMPF.